United States Patent [19]

Iuchi

[11] Patent Number: 4,705,091
[45] Date of Patent: Nov. 10, 1987

[54] HEAVY DUTY PNEUMATIC RADIAL TIRES
[75] Inventor: Munenori Iuchi, Shirakawa, Japan
[73] Assignee: Sumitomo Rubber Industries, Ltd., Japan
[21] Appl. No.: 758,374
[22] Filed: Jul. 24, 1985
[51] Int. Cl.$^4$ .............................................. B60C 15/06
[52] U.S. Cl. ..................... 152/541; 152/534; 152/543; 152/546; 152/547; 152/554; 152/556
[58] Field of Search ............... 152/543, 546, 542, 548, 152/551, 552, 556, 541, 554, 530, 454, 534

[56] References Cited

U.S. PATENT DOCUMENTS

| | | | |
|---|---|---|---|
| 3,964,533 | 6/1976 | Arimura et al. | 152/541 |
| 4,120,338 | 10/1978 | Mirtain | 152/541 |
| 4,185,677 | 1/1980 | Motomura et al. | 152/541 |
| 4,212,340 | 7/1980 | van der Burg et al. | 152/541 |
| 4,215,737 | 8/1980 | Motomura et al. | 152/543 X |
| 4,352,383 | 10/1982 | Matsumoto et al. | 152/543 X |
| 4,398,584 | 8/1983 | Tansei et al. | 152/543 |
| 4,495,976 | 1/1985 | Makino et al. | 152/543 |

Primary Examiner—Michael Ball
Assistant Examiner—Thomas Bokan
Attorney, Agent, or Firm—Stevens, Davis, Miller & Mosher

[57] ABSTRACT

Heavy duty pneumatic radial tire which has the feature as follows: a pair of bead cores; a carcass ply which is composed of steel cords being turned up around the bead core from the inside toward the outside and disposed with respect to the radial direction; a belt layer whose cords are disposed at a comparative low angle with respect to the equatorial line of the tire and a steel cord reinforcing layer disposed adjacent to the outside of the turned up portion of the carcass ply, the height h0 of the said turned up portion from the bead base portion is within a range of between 55 mm and 80 mm.

The rubber thickness t which is between the carcass ply itself and its turned up portion, is at a certain height h from the bead base portion, t/h decreases gradually in inverse proportion to values of h/h0 within the range of $0.3 \leq h/h0 \leq 0.5$ or $0.3 \leq h/h0 \leq 0.8$, and takes an approximate constant value from 0.1 to 0.25 within the range of $1.0 \leq h/h0 > 0.5$ or $1.0 \leq h/h0 > 0.8$.

10 Claims, 6 Drawing Figures

HEAVY DUTY PNEUMATIC RADIAL TIRES

BACKGROUND OF THE INVENTION

1. Field of the Invention

The present invention relates to an improvement of a structure for reinforcing bead sections of radial tires provided with carcass ply composed of steel cords, particularly radial tires for heavy duty vehicles such as trucks and buses etc.

2. Description of the Prior Art

In vehicles of this type, bias tires have been primarily used, lately, there have been used radial tires each having a rigid reinforcement at its tread portion, particularly a belt reinforcement composed of metal cords such as steel cords or the like.

In general, radial tires using metal cords as a belt reinforcement have several merits such as wear resistance, puncture resistance and the like as compared with the usual bias tires. This is because a stiff belt is disposed between the tread rubber and the carcass ply, but this belt may have adverse effects on the ride of the vehicle due to the rigid reinforcing effect with the belt. Such tires include a belt layer whose cords are disposed at an angle of 10° to 30° with respect to the equatorial plane of the tire and circumferentially extending on the carcass ply.

Therefore, the development of such radial tires are particularly advanced for use on good roads as opposed to poorer roads. Lately, the demand for these tires is conspicuous with the remarkable improvement of roads, such as the development of the express way networks and the like.

Radial tires are often built wherein cords of carcass plies are wrapped around a bead core from the inside to the outside of tires and are arranged in radial direction of a tire or semiradial tires wherein the cords of carcass plies are inclined at an angle of 10° to 30° with respect to the radial direction.

Such a steel cord reinforcing layer is secured at least near the bead portion and extended upwardly from at least near the bead base portion to a given height in a radial direction, has a weak resistance to the lateral force acting on the tire. As a result, the flexible sidewall portion produces a discontinuity of rigidity near the radially outer end of the steel cord reinforcing layer which has a very high rigidity, so that when the tire is deformed under a load, peeling of the steel cord reinforcing layer and the turned up portion of the carcass ply may occur at the discontinuous area of the rigidity. Such a problem will grow and is liable to cause a separation failure of the steel cord end, which is a fatal defect in a radial tire of this type.

In order to solve this problem, there has hitherto been proposed a method of arranging an additional organic fiber cord layer outside or inside a position corresponding to the radially outer end of the steel cord reinforcing layer and the like with respect to the axial direction of tire. Two typical embodiments of the said prior art will be explained in detail as follows.

One of them (Japanese Pat. No. 9674522) is characterized in that a steel cord reinforcing layer is disposed at the outside of the turned up portion of the said carcass ply and reinforcing fiber layers wherein two or more layers composed of organic fiber cords are crossed with each other, are arranged at the outside of the steel cord reinforcing layer and extend upwardly from the bead base up to the position at which the width of the tire cross section is at a maximum. The cut ends of the turned-up portion of the carcass ply are completely covered with the above mentioned reinforcing layers and a rubber layer composed of a hard rubber stock with JIS hardness greater than 80° and a relatively soft rubber stock with JIS hardness of about 50° to 60° is disposed above a bead core 3. This layer is positioned between the carcass main portion 2 and the turned-up portion 2' of the carcass ply 2 and the reinforcing organic fiber cord layers with the rubber layer gradually decreasing the thickness towards the side wall of the tire and a substantially triangular bead section is formed.

The other such example (U.S. Pat. No. 3557860) discloses a pneumatic radial tire, in which the beads comprise at least a pair of bead core of steel wires about which the carcass plies are turned up, said carcass plies being all turned up towards the side directed towards the rim flange, and including a triangular filler made of a high rigidity rubber layer or the like above the bead core, and reinforcing elements constituted by two groups of strips of cord fabric, each group being constituted by one or more strips, the first group being placed inwardly of the bead, between the carcass plies and the triangular filler, and the second group being placed outwardly of the bead and of the carcass plies and alongside the turned-up portion of said plies, said groups of strips extending radially from a point approximately at the height of the inner periphery of the bead ring to at least one-sixth of the height of the tire section.

The tires constructed as above described have been favorably accepted by drivers as a tire which can be used under severe and heavy load condition.

Recently, some drivers have begun to use such tires under more even severe conditions due to economic conditions such that as a result, bead separation failure is sometimes induced. On the one hand, in order to substantially reduce the cost of tires, the rate of using a steel cord radial tire as a recaped tire has increased. It has become the present tendency to recap a worn tire two or three times. Under such circumstances, it is vigorously desired to eliminate bead separation failure which is vital to preserving a recapable tire carcass, and hence it is desirable to provide highly durable reinforced bead constructions; but the premature failure due to the aforementioned peeling phenomenon are not yet solved even by these preposals.

BRIEF SUMMARY OF THE INVENTION

An object of the present invention is to provide a pneumatic radial tire having an improved bead portion reinforcing construction which can effectively prevent the separation failure of the steel cord ends of the carcass ply turned-up portions and the steel cord reinforcing layer which are serious weakpoint in the radial tire.

BRIEF DESCRIPTION OF THE DRAWINGS

FIG. 3 is a partially cross sectional view of a bead portion in a tire according to the prior art.

DETAILED DESCRIPTION

Heretofore, the bead construction of radial tires wherein a carcass ply composed of steel cords is turned up around a pair of bead cores from the inside towards the outside with respect to the axial direction of the tire and a steel cord reinforcing layer is disposed on the outside of the turned up portion of said carcass ply has been widely adopted as a favorable durable bead construction for heavy duty radial tires as above mentioned. There are two turned up constructions of the bead portion of a carcass ply, one is what is called a high ply turned up construction wherein the perpendicular height of the radially outermost end of the turned up portion of carcass plies from the bead base is higher than that of the steel cord reinforcing layer, and the other is a low ply turned up construction wherein the said height of the outermost end of the turned up portion is lower than that of the steel cord reinforcing layer.

Under severe service conditions, the carcass ply tends to remove from bead cores due to the stretching stress repeated on the carcass ply during every rotation of the tires. Therefore, in order to prevent the above removal of the carcass ply from bead cores, the high ply turned up construction is used in radial tires for heavy duty vehicles.

However, the problem of separation failures in the bead section are not yet fully solved even by this kind of construction.

The inventor has found out from various experimental results that the separation failure of the bead portion is mainly caused by deformation of the bead portion during running under load, and has paid great attention to the deformation of the bead portion and found a far superior connection of the carcass ply and its turned-up portion with respect to the said deformation in the region of this bead portion to enable to supress the deformation to a minimum extent at the upper end of the turned up portion by disposing the carcass ply and its turned up portion at a certain position, which is mentioned later, and finally accomplished this invention.

The following is the explanation of the radial tire for heavy duty vehicles according to one embodiment of the present invention.

Figure 1:
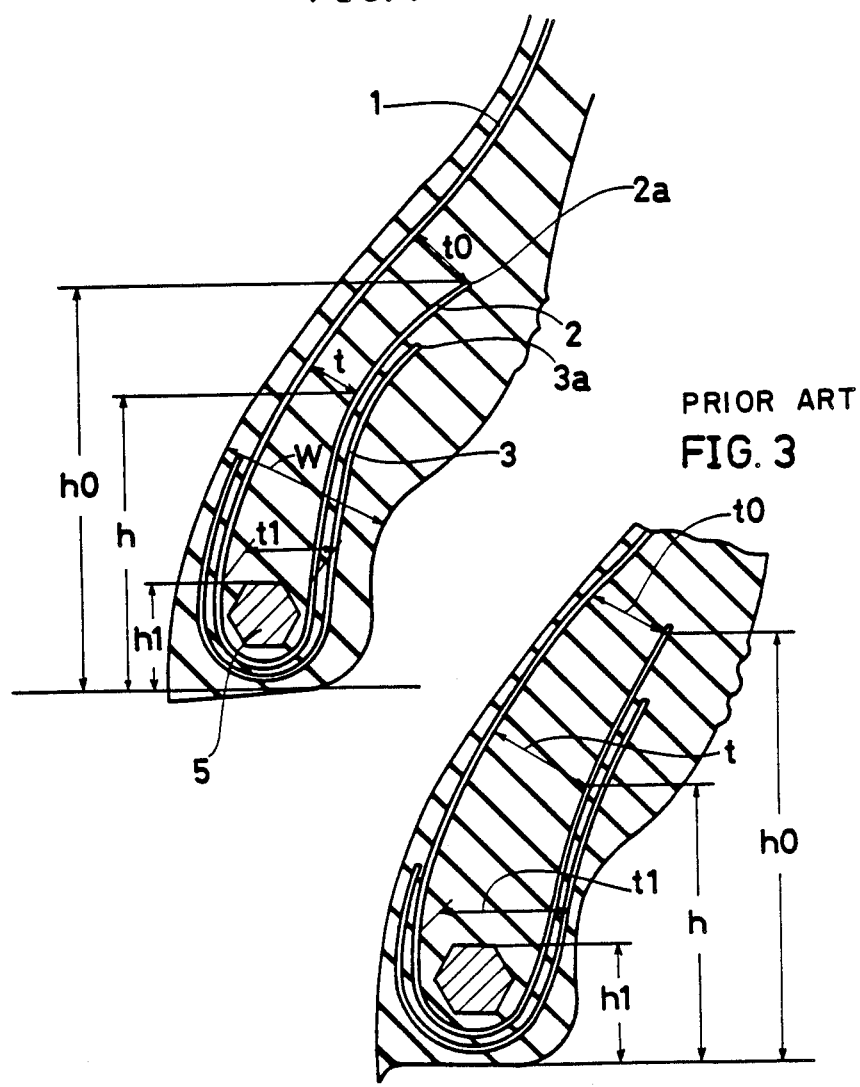
FIG. 1 is a partially sectional view of the bead portion of one embodiment of the pneumatic radial tire for heavy vehicles according to the present invention.

In FIG. 1 is illustrated the carcass ply 1, which is turned up around the bead core 5 from the inside toward the outside. The steel cords composing the carcass ply are arranged at the angle of about 90° with respect to the equatorial line of the tire.

Steel cord reinforcing layer 3 is disposed at the outside of the turned-up portion 2 of the carcass ply 1 surrounding the whole of the bead core 5 from the inside toward the outside in the axial direction of the tire, and the radially outer end 3a of the steel cord reinforcing layer 3 is located lower than the radially outer end 2a of the turned-up portion 2, and the rubber thickness (t) between the carcass ply 1 and the turned-up portion of the carcass ply from the upper side of bead cores 5 to the direction toward the side wall portion is distributed as follows.

Namely, at the height h from the bead base portion, with regard to the minimum value of rubber thickness (t) between the carcass ply main portion and the turned-up portion 2, the ratio (t/h) of the rubber thickness (t) to the height h at the said certain height h is to decrease gradually in the direction of the side wall. In addition, when the ratio (h/h0) of said height h to the h0 of the radially outer end 2a of the turned-up portion 2 from the bead base is within the range from 0.5 to 1.0 or from 0.8 to 1.0, the ratio (t/h) takes an approximate definite value within a range of between 1.0 and 0.25.

In this way, said rubber thickness t itself decreases gradually from the upper part of the bead core 5 to the position at which the ratio h/h0 is 0.8 or 0.5 and on the contrary it increased gradully where the ratio h/h0 is over 0.8.

Heretofore, in the construction of the bead portion the said rubber thickness t tends to be constant or decrease gradually to the direction of the side wall portion. The present invention, on the other hand, is to construct the bead portion as above mentioned, so it is capable of efficiently eliminating shearing strain to yield between layers and compressive strain mainly yielded at the outside of the bead portion, i.e. at the side of the turned up portion of the carcass ply and tensile strain mainly yielded at the inside of the bead portion, i.e. at the side of the carcass ply main portion.

Besides, the vertical height h0 of the radially outer end 2a of the turnup portion of the carcass ply from the bead base portion is to be within a range from 55 mm to 80 mm.

When the height h0 is higher than 80 mm, the outermost end of the turnup portion of the carcass ply is located in the flexible zone of the side wall, so stress concentration on that end is apt to be induced, on the other hand, when the height h0 is lower than 55 mm, the reinforcement of the bead portion is not enough, which is apt to induce the carcass ply to be slipped from the bead core 5.

In the present invention the bead apex strip is disposed between the carcass ply main portion and it's turned up portion and extends from the upper part of the bead base to the side wall region.

The bead apex is preferably composed of the single layer of comparatively hard rubber strip whose JIS (Japanese industrial standard) hardness is, for instance, within a range from 55° to 95°, or a double layer in a combination of hard rubber and soft rubber, wherein hard rubber is disposed on the side of the bead core 5, while soft rubber is disposed on and adjacent to the hard rubber and extends toward the direction of the side wall. In both constructions, it is preferable that the radially outer end of the bead apex is disposed beyond the radially outer end 2a of the turned up portion of the carcass ply.

The above mentioned reinforcing layer 3 composed of steel cords being arranged at an angle between 20° and 60° with respect to the radial direction of the tire, is so disposed that it's cords cross each other in the case of where at least two plies are used as the reinforcing layer.

Figure 2:
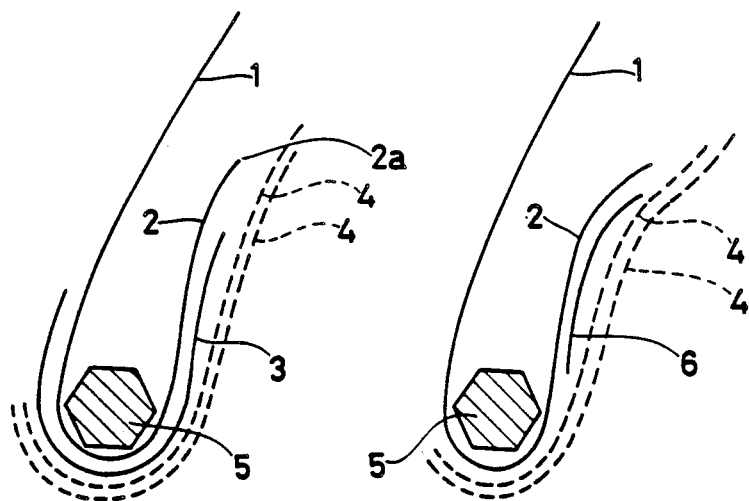
FIGS. 2(a), (b), (c) are partially sectional views of other embodiments of the bead portion of a pneumatic radial tire for heavy vehicles according to the present invention.
Figure 2:
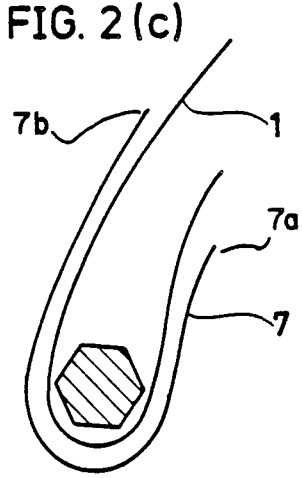

In FIGS. 2(a), (b) and (c) is shown a schematic diagram of another embodiment of a radial tire according to the present invention. FIG. 2(a) shows that two additional reinforcing layer 4 composed of rubberized organic fiber cords are disposed adjacent and on the outside of the steel cord reinforcing layer and extend from the bead base portion to a position over the radially outermost end 2a of the turned up portion 2 of the carcass ply. These organic fiber cords may be nylon, polyester, rayon or aromatic polyamid fiber cord. This kind of construction enables one much more effectively to eliminate the strains at the upper end 2a of the turned up portion 2. In FIG. 2(b) is shown the steel cord reinforcing layer 6 being disposed from axially outside of the bead core to the position under the radially outermost ply without being turned up around the bead core 5.

Furthermore, in FIG. 2(c) is illustrated the inside upper end of a steel cord reinforcing layer 7 wound up around the bead core with an inside end 7b which is disposed higher than the outside upper end 7a of the steel cord reinforcing layer 7.

For confirmation of the effect of the present invention, as shown in table 1, the durability of the bead portion has been tested with one embodiment of a radial tire according to the present invention and a conventional one, which has a size of 10.00 R20 14PR. radial tire for trucks and buses etc.

In examining the durability, the time when any damage of bead portions occurs is measured under the drum test conditions of 3,000 kg load on a tire, a running speed of 40 km/h and an internal pressure of 8.0 kg/cm². Drum endurance tests have yielded the result as shown in Table 1 that the durability of the tire according to the present invention can be improved to more than about 200% relative to the conventional tire.

Figure 4:
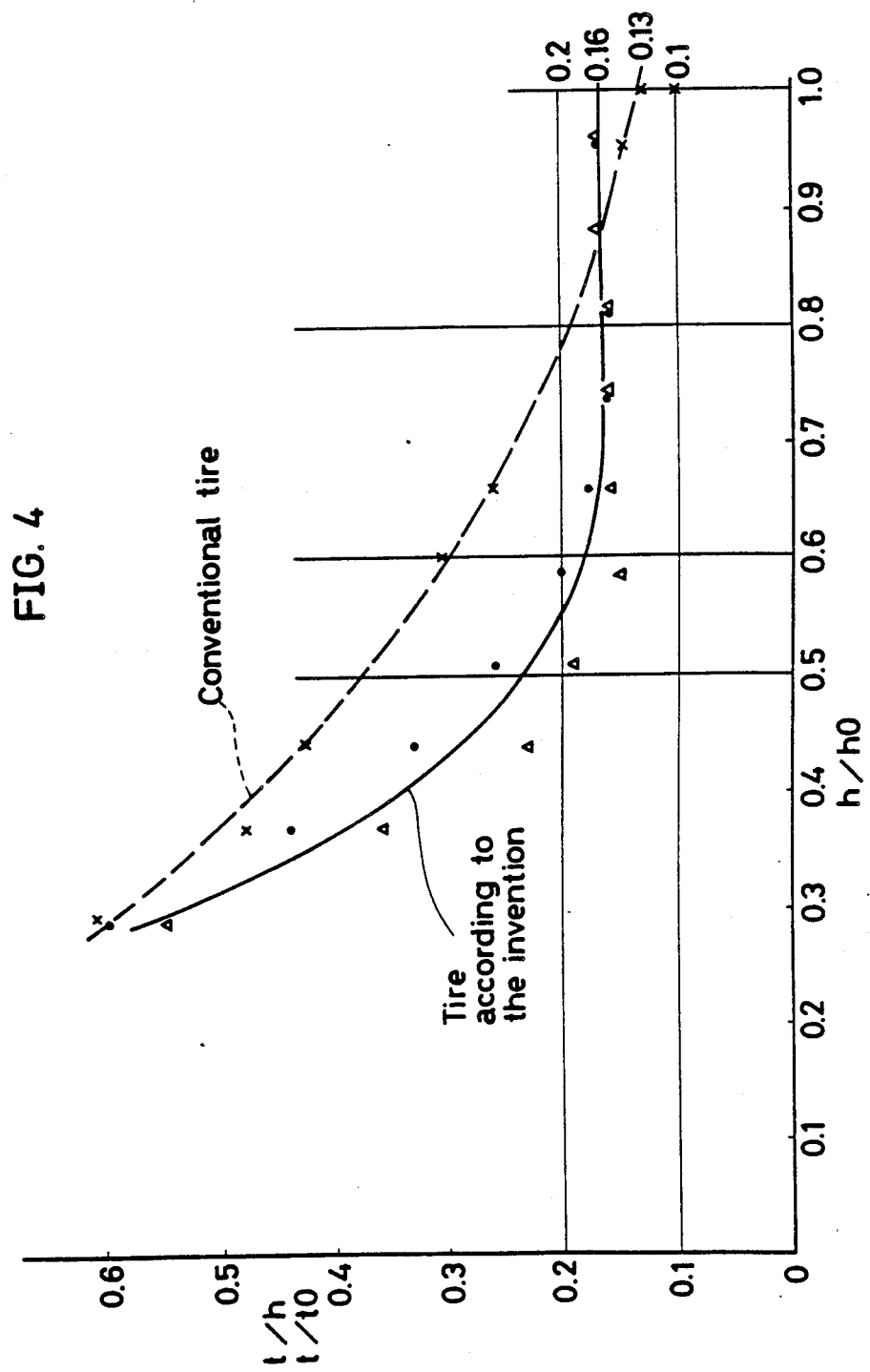
FIG. 4 is a graph showing a relationship between h/h0 and t/h of the tire according to the present invention and the conventional tire, respectively.

In FIG. 4 the relations of h/h0 and t/h on the comparison of one embodiment of the present invention and a prior art tire is shown in more detail.

TABLE 1

| constructions | Tire according to the present invention as shown in FIG. 1 | Conventional tire as shown in FIG. 3 |
|---|---|---|
| (1) the height of turnup end (ho) mm | 68 | 68 |
| t/h at 0.6 of h/ho | 0.18 | 0.30 |
| t/h at the upper part of bead core | 0.65 | 0.68 |
| to/ho at the upper end of the turnup portion | 0.16 | 0.13 |
| (2) the height of the reinforcing layer mm | 57 | 57 |
| (3) JIS hardness of bead apex in single layer | 86 | 86 |
| Drum endurance test results in index | 205 | 100 |

What is claimed is:

1. A heavy duty pneumatic radial ply tire, comprising:
   a carcass having a pair of axially spaced circumferentially extending bead cores and covered by rubber to define a tire bead seat adjacent each bead core;
   a carcass ply having a plurality of steel cords extending from bead to bead, with the ends of the cords being turned up around the bead core from the axial inner to the axial outer side thereof, the outermost ends of the turned up portion being at a perpendicular height h0 above its bead seat of 55 to 80 mm, the steel cords of the carcass ply lying at an angle of 90° to 70° with respect to the equatorial plane of the tire;
   a belt having a plurality of cords lying at an angle of 10° to 30° with respect to the equatorial plane of the tire and circumferentially extending on the carcass ply;
   a reinforcing layer in each bead region comprising cords disposed adjacent to the outside of the turned up portion of the carcass ply;
   the ratio t/h of the rubber thickness t at the height h between the carcass ply and its turned up portion to the height h, decreasing gradually in inverse proportion to the values of h/h0 within the range of $0.3 \leq h/h0 \leq 0.5$; the rate of the decrease in the ratio t/h, decreasing gradually in inverse proportion to the values of h/h0 within the range of $0.5 \leq h/h0 \leq 0.8$; and the ratio t/h taking an approximate constant value from 0.1 to 0.25 within the range of $0.8 < h/h0 \leq 1.0$; wherein the rubber thickness t at a height h between the carcass ply and its turned up portion is defined as the minimum distance from the point on the turned up portion of the carcass ply at a perpendicular height h above the tire bead seat to the carcass ply.

2. The tire of the claim 1, wherein the radial outer end of the reinforcing layer lies radially inwardly of the end of the turned up portion of the carcass ply.

3. The tire of the claim 2, wherein the radial inner end of the reinforcing layer is wrapped around the bead core.

4. The tire of the claim 3, wherein the radial outer ends of the reinforcing layer lies at a greater radial distance above the bead core than the radial inner end thereof.

5. The tire of the claim 1, wherein the reinforcing layer comprises at least one layer of steel cords.

6. The tire of the claim 1, wherein the reinforcing layer comprises at least one layer of organic fiber cords.

7. The tire of the claim 1, wherein the rubber radially outward of the bead core and between the carcass ply and its turned up portion is hard rubber of a hardness within the range from 55 to 95 JIS.

8. The tire of the claim 7, wherein the hard rubber extends radially outwardly beyond the end of the turned up portion.

9. The tire of the claim 1, wherein the cords of the reinforcing layer lie at an angle between 20° to 60° with respect of the radial direction of the tire.

10. The tire of the claim 1, wherein the radial inner end of the reinforcing layer lies between the bead core and the bead seat of the tire.

* * * * *